(12) United States Patent
Yamamoto

(10) Patent No.: US 6,480,243 B2
(45) Date of Patent: *Nov. 12, 2002

(54) INSTALLATION STRUCTURE FOR PANEL-TYPE DISPLAY DEVICE

(75) Inventor: Kouichi Yamamoto, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/334,663

(22) Filed: Jun. 17, 1999

(65) Prior Publication Data

US 2001/0043290 A1 Nov. 22, 2001

(30) Foreign Application Priority Data

Jun. 18, 1998 (JP) .......................... 10-171683

(51) Int. Cl.⁷ ............................................. H04H 5/64
(52) U.S. Cl. ..................... 348/836; 312/242; 312/7.2
(58) Field of Search ................ 348/836; 312/242, 312/7.2, 213; 40/565, 568, 124.5, 781; 52/27, 220.1

(56) References Cited

U.S. PATENT DOCUMENTS

| | | | | | |
|---|---|---|---|---|---|
| 2,216,873 A | * | 10/1940 | Browne | .................. | 312/213 X |
| 2,672,506 A | * | 3/1954 | Schulz | .................... | 312/242 X |
| 3,004,815 A | * | 10/1961 | O'Kain et al. | .............. | 312/242 |
| 4,843,477 A | * | 6/1989 | Mizutani et al. | ......... | 312/7.2 X |
| 4,843,782 A | * | 7/1989 | Gustaveson | ............. | 312/242 X |
| 5,264,765 A | | 11/1993 | Pecorino et al. | | |
| 5,293,244 A | * | 3/1994 | Kawaguchi | ............... | 312/7.2 X |
| 5,410,373 A | * | 4/1995 | Sagues et al. | .......... | 312/242 X |
| 5,573,321 A | * | 11/1996 | Bell, Jr. | ...................... | 312/242 |

FOREIGN PATENT DOCUMENTS

| | | |
|---|---|---|
| JP | 07 322171 | 12/1995 |
| JP | 07 336625 | 12/1995 |
| JP | 10 174020 | 6/1998 |
| JP | 10 207385 | 8/1998 |
| WO | WO 97/17805 | 5/1997 |

* cited by examiner

Primary Examiner—Lanna Mai
Assistant Examiner—Jerry A. Anderson
(74) Attorney, Agent, or Firm—Sonnenschein, Nath & Rosenthal

(57) ABSTRACT

An installation structure is so configured as to allow a panel-type display device to be installed in the following manner. A fixing frame is fixed and fastened to a rectangular opening portion of a wall in advance. After being placed in the fixing frame, the panel-type display device is pressed by a pressing member against the fixing frame.

3 Claims, 9 Drawing Sheets

INSTALLATION STRUCTURE FOR PANEL-TYPE DISPLAY DEVICE

RELATED APPLICATION DATA

The present application claims priority to Japanese Application No. P10-171683 filed Jun. 18, 1998, which application is incorporated herein by reference to the extent permitted by law.

FIELD OF THE INVENTION

The present invention relates to an installation structure for a panel-type display device and particularly to an installation structure for a panel-type display device which is placed in a recess or an opening of a wall.

BACKGROUND OF THE INVENTION

The cathode-ray tube (CRT) has been the mainstream of conventional display devices. Being heavy and long in depth, the CRT has difficulty disposing it in a recess or an opening of a wall. That is, for display in public facilities or the like, a hole is formed in a wall and a television receiving set that is on the market and long in depth is fitted into the hole and fixed thereto. As such, as for the conventional CRT display device, there is no product of a television receiving set or a display set that is dedicated to hanging on or burying in a wall.

However, in recent years, large-size panel-type display devices such as the plasma display panel and the plasma-addressing liquid crystal display panel have been provided and the progress of the related technology is remarkable. Such display devices as the plasma display or the like that has been marketed so far are basically in a form of a stationary television monitor. And display devices of this type having, as an option, a metal fitting for fixing to a wall are provided.

FIG. 1A shows how a panel-type display device using a conventional fixing panel is fixed. A fixing metal fitting 2 is fixed to a wall surface 1 in advance by using screws 3 or the like. A panel-type display device 5 is hanged on hooks 4 that are provided at the corner portions of the fixing metal fitting 2. The panel-type display device 5 is connected to a separately provided tuner 6 via an image signal cable 7.

Japanese Unexamined Patent Publication No. Hei. 7-336625 discloses an accommodation hanging mechanism for a wall-mounted television in which a signal unit is installed in a frame that is fixed to a recess of a wall, a display frame fixing frame is rotatably fixed to the above frame via a hinge, and a display panel is fixed to the display frame fixing frame.

Conventional installation structures of the above kind for a panel-type display device have a problem that a user cannot easily fix a display panel in a recess or an opening of a wall. Further, not equipped with a dedicated connection mechanism for connecting such a display panel to a power cable, a coaxial cable, or a cable television cable, they have a problem that an operation of making such a connection is very difficult.

The present invention has been made in view of the above problems, and an object of the invention is therefore to provide an installation structure for a panel-type display device that allows the user to easily fix the display device in a recess or an opening of a wall, the panel-type display device having a use that is absent in the conventional CRT display device.

SUMMARY OF THE INVENTION

The invention provides an installation structure for a panel-type display device, comprising a fixing frame to be inserted in an approximately rectangular recess or opening that is formed in a wall, for accommodating a panel-type display device; and a pressing member to be fixed to the fixing frame from the outside of the fixing frame, for fastening the panel-type display device.

The fixing frame may have a flange for covering a portion of the frame around the approximately rectangular recess or opening. The fixing frame may have terminals to be connected to a power line and a signal line that are wired inside the wall. The fixing frame may have, on its front side, an air inlet and an air outlet for ventilation of the space inside the fixing frame. The pressing member may be a frame-like pressing cover for pressing a peripheral portion of the panel-type display device. Further, the pressing member may be pressing plates for pressing peripheral portions of the panel-type display device that extend along two opposed sidelines of the panel-type display device.

According to another aspect of the invention, there is provided an installation structure for a panel-type display device, comprising a fixing frame to be inserted in an approximately rectangular recess or opening that is formed in a wall; and a pressing member for pressing a device placed in the fixing frame from the outside against the fixing frame, wherein a panel-type display device or a decorative article such as a painting is to be placed in the fixing frame selectively.

A preferred embodiment of the invention is directed to an installation structure for fixing a panel-type display device such as a plasma display panel or a plasma-addressing liquid crystal display panel to a recess or opening of a wall. In particular, a rectangular recess or opening is formed in a wall in advance in building construction work, and a bushing-type fixing frame is inserted in such a recess or opening instead of directly fixing a panel-type display device to it. By providing the bushing-type fixing frame with a flange that covers the recess or opening of the wall, the size of the recess or opening can be formed roughly, that is, with low accuracy.

The fixing frame may be provided with terminals that are to be connected to a power cable, a signal cable, etc. and a power cable and a signal cable may be connected to those terminals in advance at the time of work of fixing the fixing frame. In this case, when the panel-type display device is fixed to or removed from the fixing frame, the time and labor for the connection or removal of a power cable and a signal cable can be eliminated. By fixing the above-described fixing frame in advance to a wall of an apartment or the like, the user can purchase a wall-mounted panel-type display device any time and fix it to the wall by himself. Where the user does not want to fix a wall-mounted display device, he may insert a decorative article such as a painting in the above-described fixing frame and press it with a cover.

As for the panel-type display device to be fixed by means of the fixing frame, its external dimensions and power connection portion and signal connection portion may be adapted to the fixing frame and several models may be prepared having different screen sizes and numbers of scanning lines. This allows the user to select a panel-type display device in accordance with his purpose and taste. Further, by forming an air inlet and an air outlet on the front side of the fixing frame, it becomes unnecessary to install, in a wall, a ventilation device for cooling the panel-type display device.

If handles are attached to the panel-type display device to be fixed by means of the fixing frame, the panel-type display device can easily be fixed to or removed from the fixing frame. A pressing member provided on the front side of the fixing frame to press the panel-type display device can prevent a fall of the panel-type display device.

With the above-described installation structure for a panel-type display device, the panel-type display device can be used as a new form of visual telephone or the like as well as a television receiver. By changing the design of the pressing member for pressing the panel-type display device that is fixed to the fixing frame in accordance with the user's taste, display can be provided having a design that matches the room.

DESCRIPTION OF THE PREFERRED EMBODIMENTS

Figure 9:
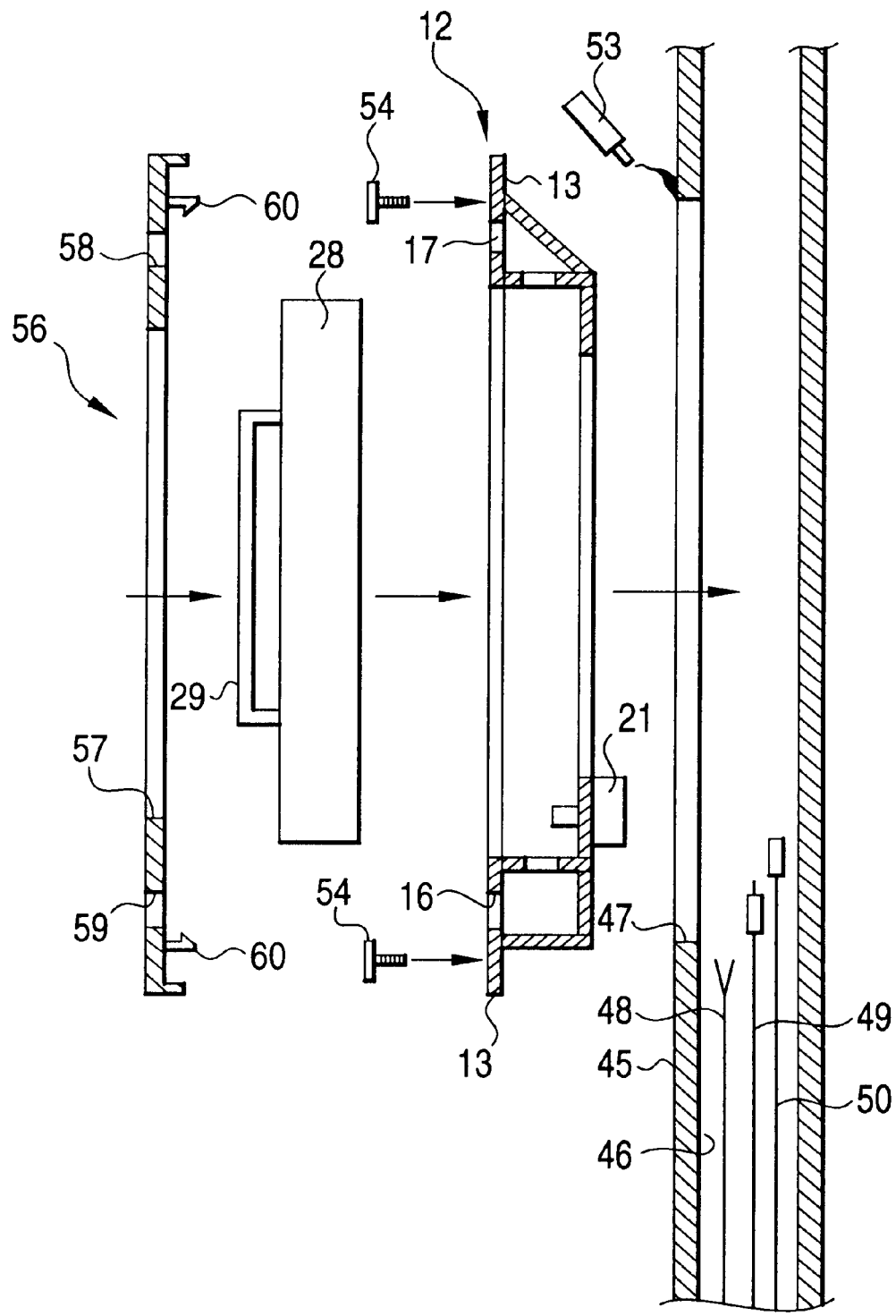
FIG. 9 is a vertical sectional view showing how the panel-type display device is fixed to a wall.

FIGS. 1B–3 show a fixing frame, FIGS. 4–8 show a panel-type display device to be fixed to a wall by using the fixing frame, and FIG. 9 shows structures for fixing the panel-type display device.

First, a fixing frame will be described with reference to FIGS. 1B–3. A fixing frame 12 is a cast member of an aluminum alloy or a molded body of a synthetic resin such as a polycarbonate resin. That is, the fixing frame 12 is a rectangular frame made of a material that is relatively light and is not affected by heat.

A flange 13 is provided integrally with the thus-configured fixing frame 12 that is a rectangular frame, as a front peripheral portion to cover the edges of a recess or an opening that is formed in a wall. Further, screw insertion holes 14 to be used for fixing the fixing frame 12 to the wall surface are formed at the four corner portions of the flange 13. Engagement holes 15 for allowing engagement of a pressing member from the front side after a panel-type display device has been inserted in the fixing frame 12 are formed in a peripheral portion of the flange 13.

An air inlet 16 and an air outlet 17 are formed in front, bottom and top portions, respectively, of the thus-configured fixing frame 12 that is a rectangular frame. It is preferable that each of the air inlet 16 and the air outlet 17 be equipped with a mesh on the front side and a filter inside so that the filter can be removed and replaced.

The back surface of the fixing frame 12 is formed with terminals to be connected to a power cable and signal cables that run through the inside of the wall. That is, there are provided a power terminal 21 to be connected to a power cable, a coaxial cable terminal 22 to be connected to a coaxial cable, a telephone line terminal 23 to be connected to a telephone line (ISDN: Integrated Service Digital Network), and a cable television terminal 24 to be connected to a cable television cable.

Figure 1A:
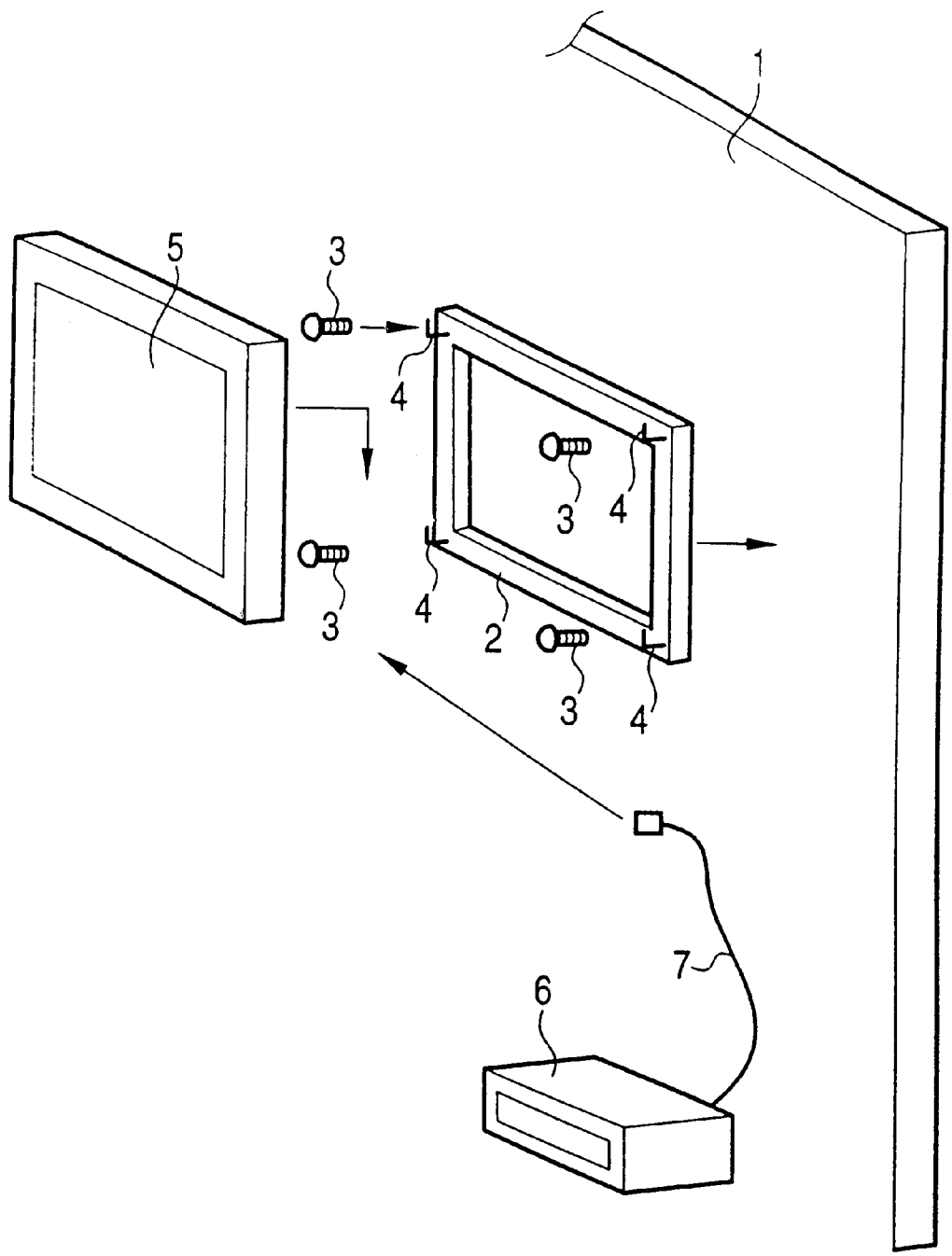
FIG. 1A is a perspective view showing how a conventional panel-type display device is fixed to a wall surface.
Figure 1B:
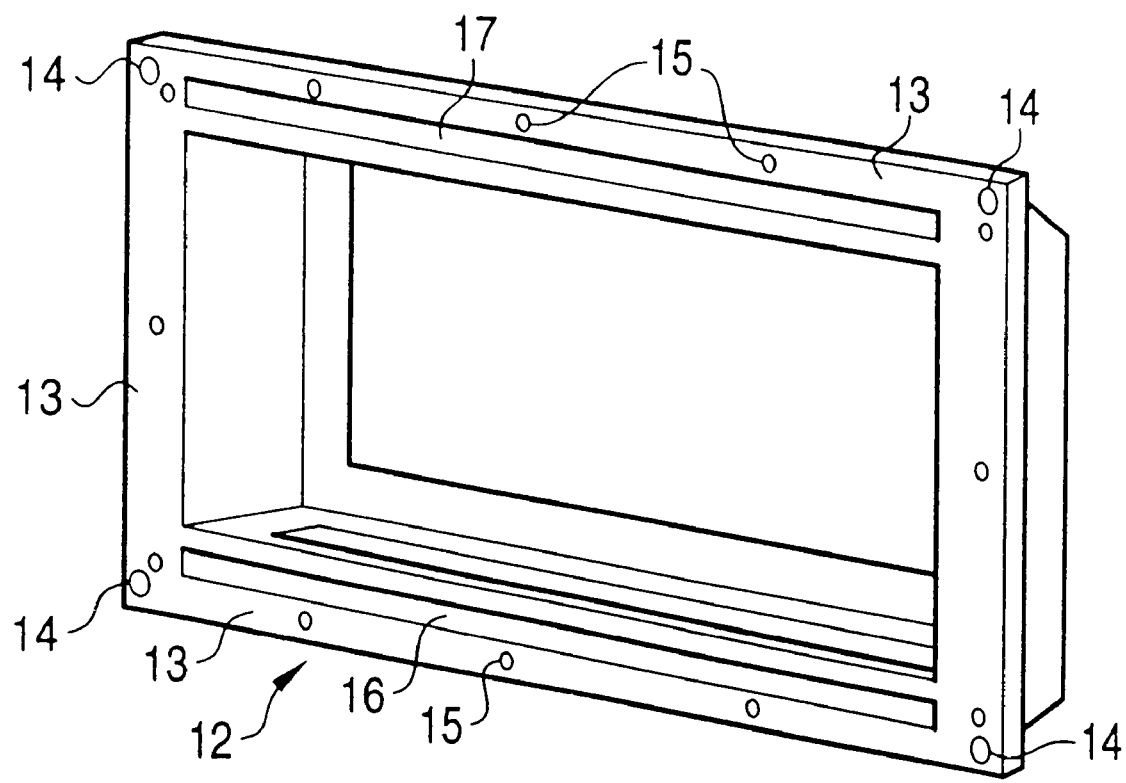
FIG. 1B is a perspective view showing a fixing frame according to an embodiment of the present invention.
Figure 2:
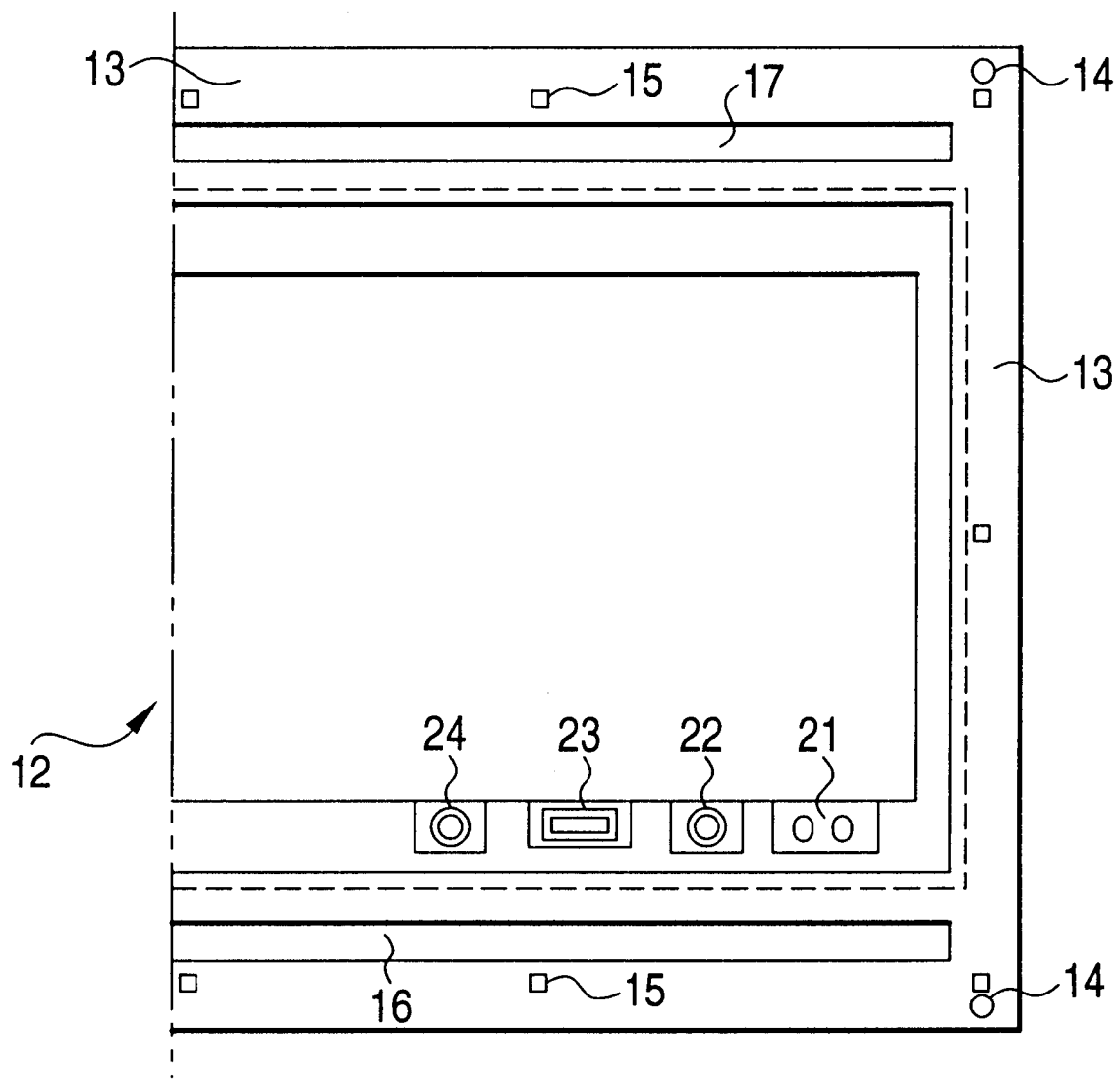
FIG. 2 is an enlarged front view of the main part of the fixing frame.
Figure 3:
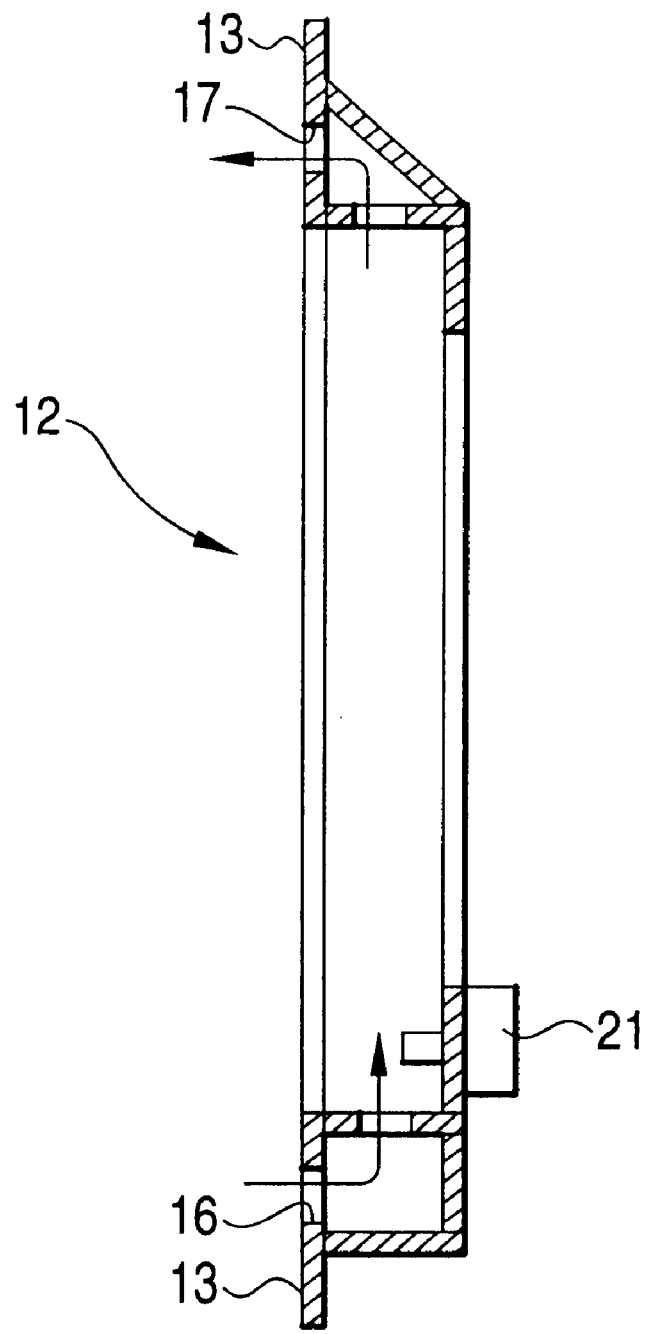
FIG. 3 is a vertical sectional view of the fixing frame.
Figure 4:
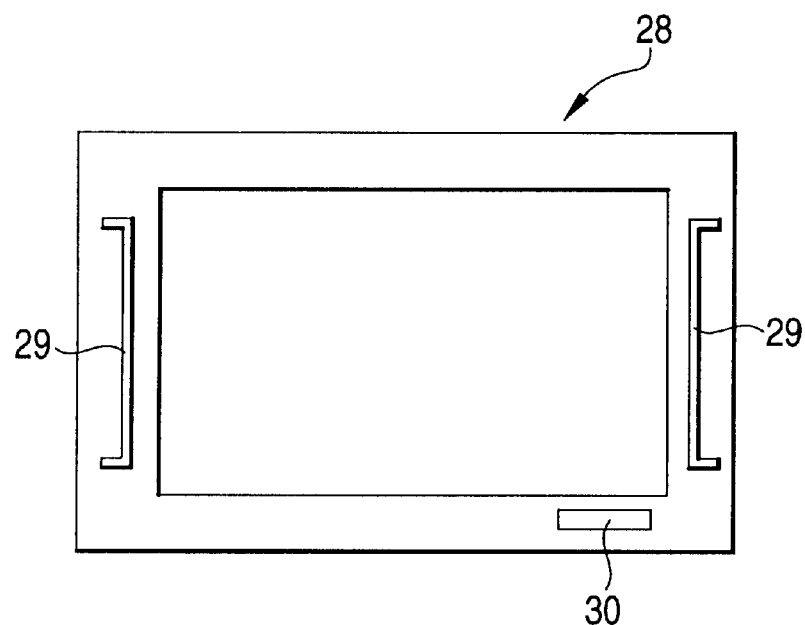
FIG. 4 is a front view of a panel-type display device.

A panel-type display device 28 to be inserted in the thus-configured fixing frame 12 has a flat, rectangular panel shape as shown in FIG. 4 and has dimensions that are somewhat smaller than the inside dimensions of the opening of the fixing frame 12. Therefore, the panel-type display device 28 can be housed in the opening of the fixing frame 12 without difficulty.

Handles 29 are attached to the front surface of the thus-configured panel-type display device 28 on the right and left sides, whereby the panel-type display device 28 can easily be inserted into or removed from the fixing frame 12 by using the handles 29. It is preferable that the handles 29 be of a folding type so that it can be covered with a front cover for preventing a fall of the panel-type display device 28 that is inserted in and fixed to the fixing frame 12. Further, the front surface is formed with input terminals 30 to allow a connection to an external device such as a video tape recorder, a personal computer, a laser disc player, a video game machine, or the like.

Figure 5:
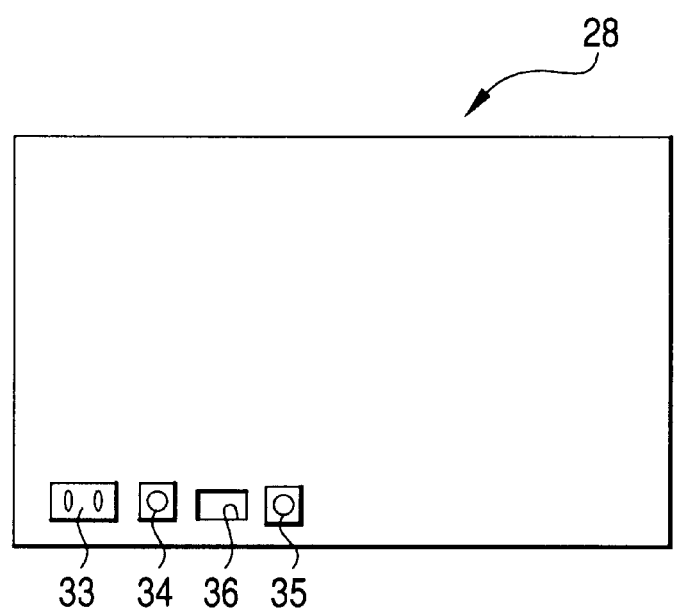
FIG. 5 is a rear view of the panel-type display device.

As shown in FIG. 5, the back surface of the above-configured panel-type display device 28 is formed with a power connection portion 33, a coaxial cable connection portion 34, and a cable television connection portion 35. In contrast, a rectangular hole 36 is formed at a portion corresponding to the telephone line terminal 23 of the fixing frame 12; this panel-type display device 28 does not use a signal coming from the ISDN line.

Figure 6:
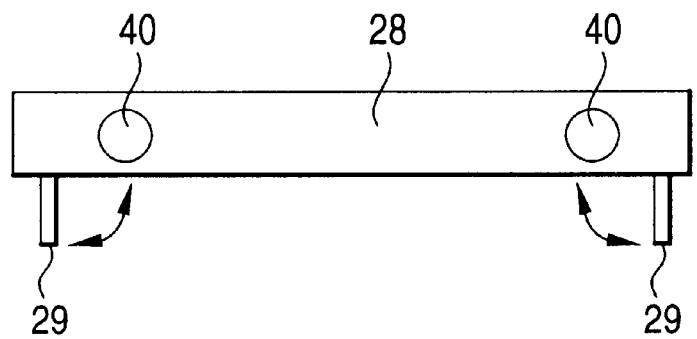
FIG. 6 is a plan view of the panel-type display device.
Figure 7:
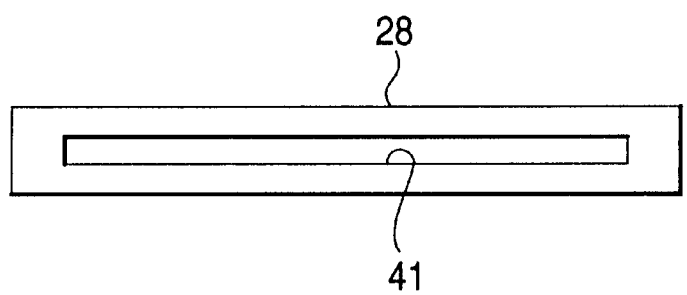
FIG. 7 is a bottom view of the panel-type display device.
Figure 8:
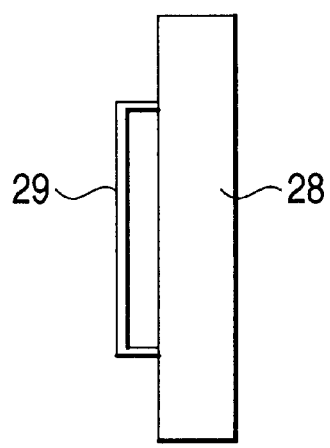
FIG. 8 is a right-hand side view of the panel-type display device.

Alternatively, a connection portion to be connected to the telephone line terminal 23 may be provided, in which case the panel-type display device 28 can be used as a display device of a visual telephone. Specifically, the receiving function of a telephone is provided in the panel-type display device 28 and the functions of a child machine of a wireless telephone are given to a remote controller, or a dedicated child machine is prepared. During transmission or reception of a telephone call, the panel-type display device 28 is switched to a telephone mode by the remote controller and the user talks to the other party with the remote controller or the child machine while watching his image on the panel-type display device 28. It is preferable that the wall-mounted, panel-type display device 28 be so constructed that the function as mentioned above can be added to it, while it can serve as a conventional television broadcast monitor.

Where the panel-type display device 28 is a display set that requires a cooling fan, air outlets 40 are provided in its top portion as shown in FIG. 6 and an air inlet 41 is provided in its bottom portion as shown in FIG. 7, which makes it possible to cause a cooling wind to flow through the panel-type display device 28 by utilizing the air inlet 16 and the air outlet 17 of the fixing frame 12.

Next, with reference to FIG. 9, a description will be made of how the panel-type display device 28 is fixed by using the fixing frame 12 having the above-described configuration. A rectangular opening 47 is formed, at a prescribed position, in a wall 45 having an inside cavity 46 of an apartment or the like. In this example, since there exists a back wall, a recess is formed in the opening 47 portion of the wall 45.

A power cable 48, a coaxial cable 49, and a cable television cable 50 should be wired in advance in the cavity 46 of the wall 45.

Then, the fixing frame 12 that has been prepared in advance is engaged with the rectangular opening 47 portion of the wall 45. Since the fixing frame 12 will be fastened later by screws, no fitting is needed. Further, since the flange 13 covers the edges of the rectangular opening 47, it is not necessary to form the rectangular opening 47 clearly in the wall 45 and hence an operation of forming the opening 47 in the wall 45 can be performed relatively easily.

After the fixing frame 12 has been engaged with the rectangular opening 47, the power cable 48, the coaxial cable 49, and the cable television cable 50 are connected to the power terminal 21, the coaxial cable terminal 22, and the telephone line (ISDN) terminal 23 of the fixing frame 12, respectively. Then, adhesive 53 is applied to the portion around the rectangular opening 47 in such a manner that it does not go out of the outside periphery of the flange 13 of the fixing frame 12. After the frame 12 has been engaged with the rectangular opening 47, it is fastened tentatively with the adhesive 53. The fixing frame 12 is then fastened to the front surface of the wall 45 by using screws 54 that are inserted through the screw insertion holes 14 of the flange 13.

The fixing of the panel-type display device 28 to the wall 45 to which the fixing frame 12 has been fixed may be performed in such a manner that the user inserts the display device 28 into the fixing frame 12 holding the handles 29. At this time, the power connection portion 33, the coaxial cable connection portion 34, and the cable television connection portion 35 of the panel-type display device 28 are connected to the power terminal 21, the coaxial cable terminal 22, and the cable television terminal 24 of the fixing frame 12, respectively.

Thereafter, the handles 29 of the panel-type display device 28 are put down inward and then a pressing cover 56 is fixed to the front side of the fixing frame 12. The pressing cover 56 has a large opening 57 in a central portion, and the opening 57 is larger than the screen of the panel-type display device 28 and smaller than its outer size. Therefore, the portion around the screen of the panel-type display device 28 is pressed by the cover 56. Since engagement hooks 60 of the cover 56 engage the engagement holes 15 of the fixing frame 12, the panel-type display device 28 is pressed against the fixing frame 12 by the pressing cover 56. This prevents a fall of the panel-type display device 28 at the occurrence of an earthquake.

An air outlet 58 and an air inlet 59 are formed in the pressing cover 56 above and below the opening 57, respectively. The air outlet 58 and the air inlet 59 face the air outlet 17 and the air inlet 16 of the fixing frame 12, respectively. Therefore, the cooling function of the panel-type display device 28 is not impaired even if the pressing cover 56 is fixed to it.

In this embodiment, the pressing cover 56 is fixed to the fixing frame 12 by means of the engagement hooks 60. Therefore, the pressing cover 56 can be removed by bending the engagement hooks 60 by inserting a screwdriver or the like. The pressing cover 56 may be fastened by means of screws or nails instead of the engagement hooks 60.

In the installation structure of this embodiment, in particular, construction work to the fixing of the fixing frame 12 may be performed in advance in construction of a building and a maker of panel-type display devices may prepare several kinds of sizes and models of panel-type display devices having such external dimensions as to be able to be mounted on the fixing frame 12, such as a display device with a visual telephone, a wide Hi-Vision television receiver having an aspect ratio 9:16, and an ordinary television receiver having an aspect ratio 3:4. This allows a user to purchase a panel-type display device 28 suitable for his purpose whenever he likes and to easily fix or replace the wall-mounted panel-type display device 28 merely by fixing the panel-type display device 28 to the fixing frame 12 and fixing the pressing cover 56. Further, if a panel of a decorative article such as a painting that can be inserted in the fixing frame 12 is prepared, it can be used for room interior decoration when the panel-type display device 28 is not set in the fixing frame 12.

Figure 10:
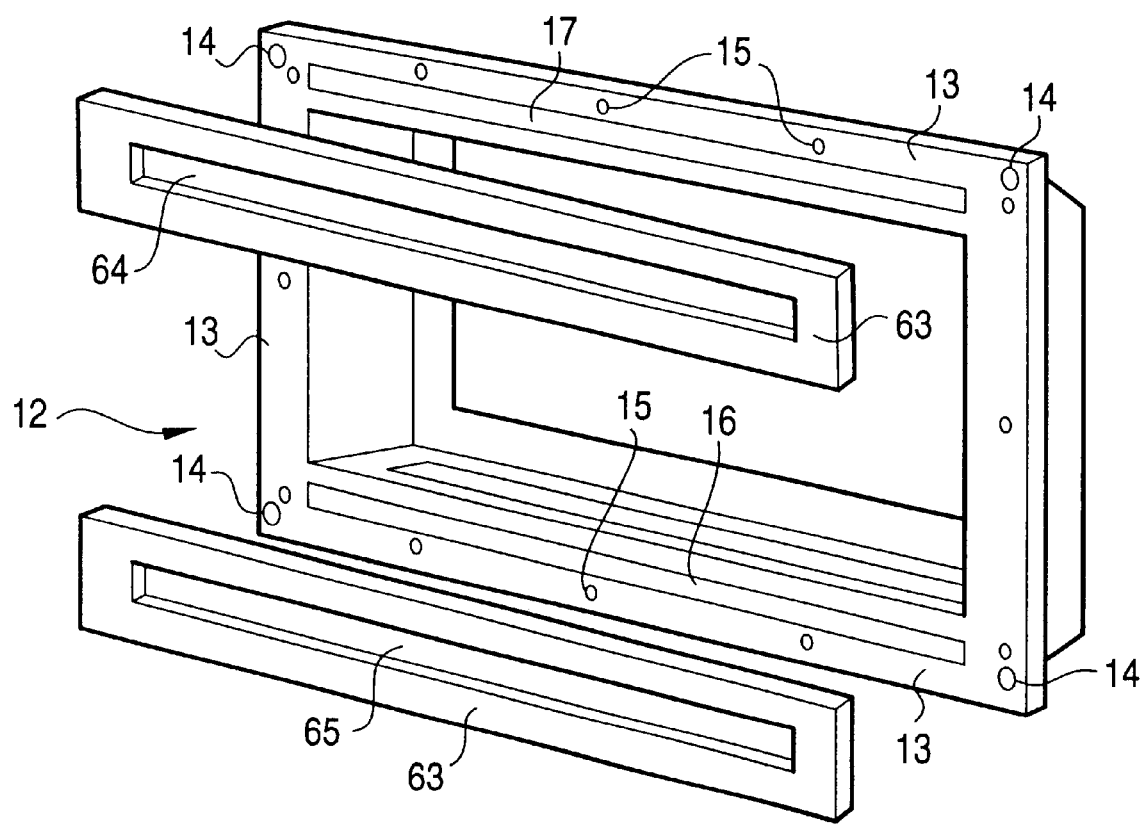
FIG. 10 is an exploded perspective view showing the structure of pressing plates according to another embodiment of the invention.
Figure 11:
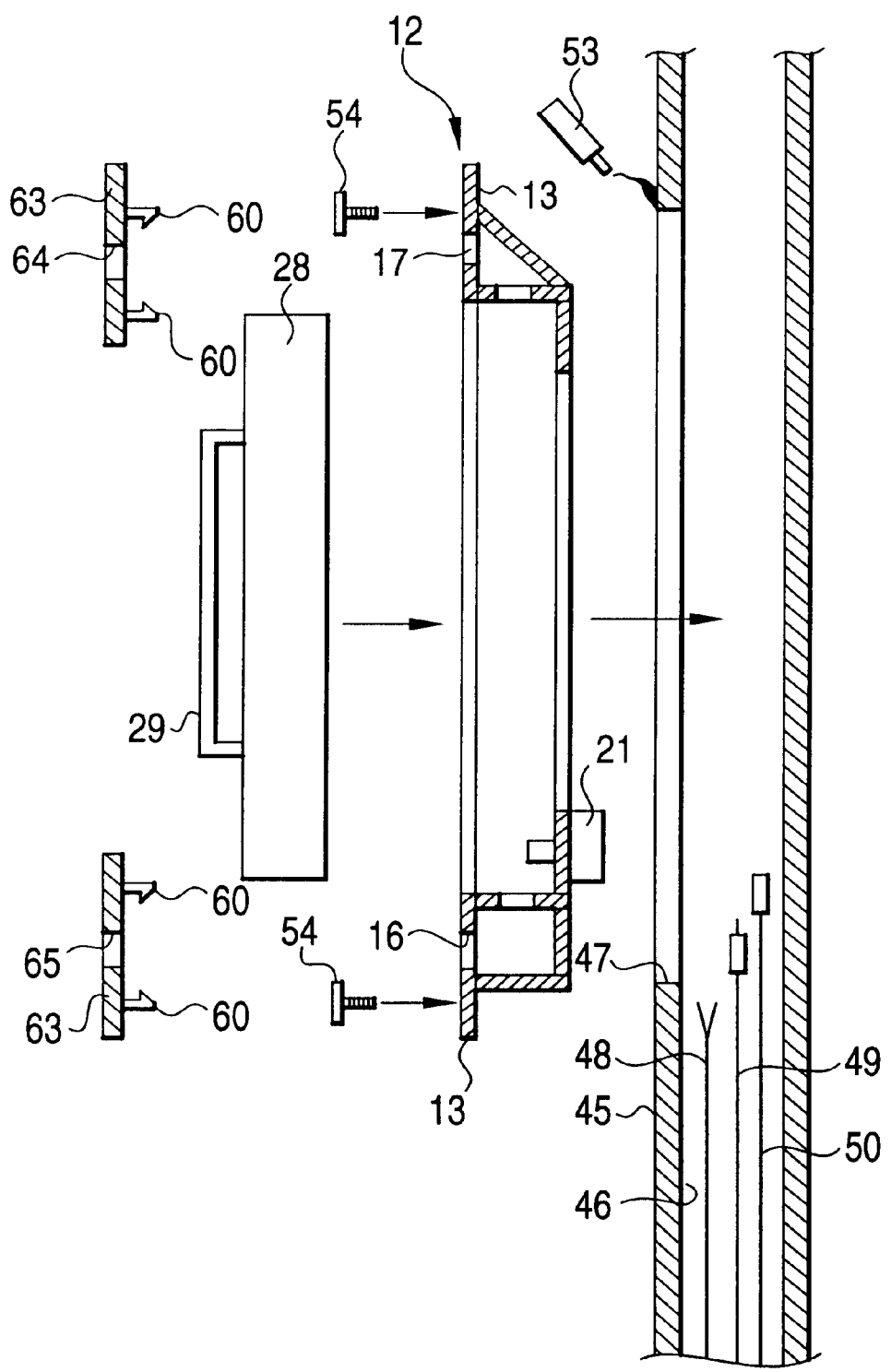
FIG. 11 is a vertical sectional view showing how a panel-type display device is fixed to a wall in the embodiment of FIG. 10.

Another embodiment will be described with reference to FIGS. 10 and 11. In this embodiment, the panel-type display device 28 is pressed against the fixing frame 12 by using a pair of, that is, top and bottom, pressing plates 63 instead of the frame-like pressing cover 56 of the above embodiment. That is, having engagements hooks 60 on their back sides, the pressing plates 63 can be fixed to the fixing frame 12 by means of the engagement hooks 60. Therefore, a panel-type display device 28 can be pressed against the fixing frame 12 by causing the respective pressing plates 63 to press the top and bottom portions of the panel-type display device 28.

The top and bottom pressing plates 63 are formed with an air outlet 64 and an air inlet 65, respectively, which face the air outlet 17 and the air inlet 16 of the fixing frame 12, respectively. Therefore, the panel-type display device 28 is cooled by causing air to flow through the air inlets 65 and 16 and the air outlets 64 and 17. Since the remaining part of the configuration of this embodiment is the same as of the above embodiment, it is not described here.

As described above, according to the invention, a fixinq frame is inserted in an approximately rectangular recess or opening that is formed in a wall, a panel-type display device is placed in the fixing frame, and a pressing member is fixed to the fixing frame from the outside of the fixing frame, whereby the panel-type display device is fastened by the pressing member.

Therefore, by inserting the fixing frame in the rectangular recess or opening in the wall in advance, the panel-type display device can easily be placed in and fixed to the fixing frame.

In a configuration in which the fixing frame has a flange that covers a portion around the approximately rectangular recess or opening in the wall, it is not necessary to finish the portion around the rectangular opening clearly.

In a configuration in which the fixing frame has terminals to be connected to a power line and a signal line that are wired inside the wall, connections to the power line and the signal line can be attained by connecting connection portions of the panel-type display device to the corresponding terminals of the fixing frame.

In a configuration in which the fixing frame has, on its front side, an air inlet and an air outlet for ventilation of the space inside the fixing frame, the panel-type display device can be cooled by air that flows through the air inlet and the air outlet.

In a configuration in which the pressing member is a frame-like pressing cover that presses a peripheral portion of the panel-type display device, the frame-like pressing cover prevents the panel-type display device from coming out of the fixing frame.

In a configuration in which the pressing member is pressing plates that press peripheral portions of the panel-type display device that extend along two opposed sidelines of the panel-type display device, the pressing plates prevent the panel-type display device from coming out of the fixing frame.

According to another aspect of the invention, there are provided a fixing frame to be inserted in an approximately rectangular recess or opening that is formed in a wall, and a pressing member for pressing a device placed in the fixing frame from the outside against the fixing frame, wherein a panel-type display device or a decorative article such as a painting is placed in the fixing frame selectively.

With the above configuration, the panel-type display device can easily be placed in the rectangular recess or opening in the wall by utilizing the fixing frame. Where the panel-type display device is not fixed, a decorative article such as a painting may be fixed in the fixing frame for the purpose of room interior decoration.

What is claimed is:

1. An installation structure, having a panel display device, comprising:

a fixing frame to be inserted in an approximately rectangular recess or opening that is formed in a wall, for accommodating a panel display device, said fixing frame having a flange for covering a portion of the wall around the approximately rectangular recess, and said fixing frame having a terminal to be connected to a power line and a signal line that are wired inside the wall; wherein the fixing frame has, on a front side thereof, an air inlet and an air outlet for ventilation of a space inside the fixing frame; and a pressing means for pressing the display device to the fixing frame.

2. The installation structure according to claim 1, wherein the pressing means presses a peripheral portion of the panel display device.

3. The installation structure according to claim 1, wherein the pressing means comprises pressing plates for pressing peripheral portions of the panel display device that extend along two opposed sides of the panel display device.

* * * * *